United States Patent [19]

Glanville et al.

[11] 4,254,166

[45] Mar. 3, 1981

[54] COMPOSITION FOR REDUCING THE STRENGTH OF ICE

[75] Inventors: James O. Glanville; Gene R. Walters, both of Roanoke, Va.

[73] Assignee: Wen-Don Corporation, Roanoke, Va.

[21] Appl. No.: 103,418

[22] Filed: Dec. 13, 1979

[51] Int. Cl.$^3$ .............................................. C09K 3/18
[52] U.S. Cl. .................................... 427/212; 106/13; 252/70; 427/220; 427/421; 427/428; 427/429
[58] Field of Search ................. 252/70; 106/13; 44/6; 427/212, 220, 421, 428, 429

[56] References Cited

U.S. PATENT DOCUMENTS

| | | | |
|---|---|---|---|
| 3,108,075 | 10/1963 | Hearst | 252/70 |
| 3,293,185 | 12/1966 | Curless et al. | 106/13 X |
| 3,624,243 | 11/1971 | Scott et al. | 252/70 |
| 3,630,913 | 12/1971 | Scott et al. | 252/70 |
| 4,117,214 | 9/1978 | Parks et al. | 252/70 X |
| 4,162,347 | 7/1979 | Montgomery | 252/70 X |
| 4,163,079 | 7/1979 | Beafore | 252/70 X |

FOREIGN PATENT DOCUMENTS

| | | | |
|---|---|---|---|
| 367852 | 8/1937 | Canada | 252/70 |
| 1027486 | 4/1966 | United Kingdom | 106/13 |
| 1111936 | 5/1968 | United Kingdom | 252/70 |

OTHER PUBLICATIONS

Abstract of F. Nicolai, Automobile Tech. 2.32[36], 843–846, (1929).
Pounder, "Mechanical Strength of Ice Frozen from an Impure Melt", Canadian Journal of Physics, vol. 36 (1958), pp. 363–370.
Bailey et al., "The Effect of Impurities on the Mechanical Strength of Accreted Ice", Journal of Atmospheric Sciences, vol. 24, pp. 707–710 (1967).

*Primary Examiner*—Harris A. Pitlick
*Attorney, Agent, or Firm*—Bacon & Thomas

[57] ABSTRACT

The strength of ice is reduced by the dissolution of a water-soluble composition composed of (A) a non- or slightly-ionizing water-soluble organic compound containing one or more hydrophilic groups, and (B) an organic or inorganic, water soluble ammonium salt, optionally with surface active agent or water and conventional additives in ice-forming water. The composition is particularly suitable for application to a wet, particulate solid material prior to its storage or transportation in sub-freezing weather to produce a frozen mass of reduced mechanical strength, thereby greatly mitigating subsequent unloading or handling of the material.

17 Claims, No Drawings

COMPOSITION FOR REDUCING THE STRENGTH OF ICE

This invention relates to improved compositions for reducing the strength of ice. During severe winter conditions, the transportation, storage, and handling of coal, rock, ores, minerals, and similar materials, is greatly exacerbated by freezing conditions. This may occur if the material has been made wet by processing, such as in the case of coal or ore prepared by a flotation or washing process; or if the material is exposed to the elements and subjected to rain or sleet. It may also occur if the material is mined or produced in a wet condition.

It has long been recognized that the use of a conventional anti-freeze agent is not an economically realistic solution to this problem. The amount of a chemical, such as ethylene glycol, which would be required to depress the freezing point of the resulting ethylene gylcol-water solution by even a few degrees could easily exceed in cost the value of the material so treated. However, certain compositions of matter when added to water in remarkably low concentrations, prior to the water's freezing, result in an ice which is physically much weaker than it would otherwise be.

U.S. Pat. No. 4,117,214 issued Sept. 26, 1978, the entire disclosure of which is herein incorporated by reference, describes a method of reducing the strength of ice by dissolving in water prior to freezing a composition of (A) a water-soluble polyhydroxy compound or monoalkylether thereof and (B) a water-soluble organic nonvolatile compound having a hydrophilic group such as amine, carboxyl or carboxylate groups in an amount to provide an effective amount, e.g., on the order of about 0.25-5 weight percent of (A) plus (B) based on the weight of water. Not only is this type of composition useful for reducing the strength of ice, it may also be used to reduce slippage of particulate material on conveyor belts.

This use is more fully described in U.S. Pat. No. 4,163,079, issued July 31, 1979, the entire disclosure of which is herein incorporated by reference. In addition to the above compositions, this patent discloses that the treating composition may also include a small amount of a polydimethyl siloxane.

While the above compositions and methods have met with some success, a number of problems still remain. One alluded to in U.S. Pat. No. 4,117,214 is the tendency of some of the substances to cause a large increase in viscosity which is troublesome to the application of the compositions to the particulate material. Thus, one drawback of the previously known compositions is that they suffer from an undesirable increase in their viscosity at low temperatures, and since the compositions are perforce used in cold weather, the drawback is experienced in the field. An increase in viscosity of the composition causes pumping systems to become increasingly taxed, and a viscous material is difficult to spray in the form of fine droplets. The ability to spray the particulate solid with a well dispersed stream of treating composition is highly desirable as this is an excellent means of obtaining uniform application and is a convenient and conventionally used technique. In order to overcome this problem of increased viscosity, heated storage tanks have been used.

In addition, in view of the enormous quantities of particulate materials treated, it is essential that the treating compositions be both inexpensive and have minimal environmental impact. For example, coal treated with conventional compositions is often stored in the open and exposed to the elements, including rain. Such exposure will inevitably lead to dissolution of some of the composition and its presence in runoff from these storage areas. Any reduction in the concentration of the composition on the treated coal will necessarily result in a lower concentration of the composition in the runoff with consequential benefit to the environment.

One of the preferred embodiments described in U.S. Pat. No. 4,117,214 includes the use of sodium acetate as constituent (B) of the composition. Sodium acetate is also a constituent of U.S. Pat. No. 4,163,079 and falls within the definition for (B) which is a water-soluble organic nonvolatile having at least one hydrophilic group.

It has now been discovered that the use of ammonium ion in replacement of the sodium ion in compositions of this general type results in the formation of ice which is of significantly lower strength. This finding was totally unexpected particularly in view of the results of Nakamura and Jones described in the Proceedings of the Symposium on the Physics and Chemistry of Ice, 1972. These results include measurements on the mechanical strength of ice doped with ammonium fluoride and sodium fluoride. These results indicate no significant difference between their strengths. In addition, Jones and Glen (Philosophical Magazine, volume 19, page 13, 1969) report that ammonia doped crystals had a slight hardening effect at $-60°$ C., whereas the above-identified Nakamura and Jones report ammonia to have a possible slight softening effect.

In its broadest aspect, the present invention comprises an anti-freeze composition for particulate materials comprising a water-soluble organic compound which is non-ionizing or only slightly ionizing and a highly soluble inorganic or organic substance containing ammonium ion. This composition can be used in amounts lower than previously known compositions at an economic advantage as well as with less environmental impact. Of course, the same application rate as for prior compositions may be used with a greater degree of ice strength reduction.

The present invention also includes a process for reducing the mechanical strength of a frozen particulate mass, such as coal and mineral ores, by adding to the surface of the particles, prior to their freezing, a composition comprising a water-soluble organic compound which is non-ionizing or only slightly ionizing and an organic or inorganic substance containing ammonium ion.

Also included in the scope of the present invention is a method for facilitating the transportation of particulate solids on a conveyor belt under conditions such that at least a portion of the belt surface is exposed to a temperature of less than 0° C. during operation of the belt. A composition comprising a water-soluble organic compound which is non-ionizing or only slightly ionizing and an organic or inorganic substance containing ammonium ion is applied to the belt.

An essential ingredient of the compositions and methods of the present invention is an organic or inorganic substance containing ammonium ion or more succinctly capable of producing ammonium ions in aqueous solution. Such compounds include ammonium salts. In particular, any highly water-soluble salt such as ammonium acetate, ammonium nitrate, ammonium sulfate, ammonium sulfanate, ammonium formate, ammonium cyanate, ammonium thiocyanate, ammonium carbonate or ammonium pentaborate may be employed. Ammonium halides are very soluble, but are not preferred due to potential corrosion problems.

The second ingredient of the composition is a water-soluble or miscible organic compound. Non- or slightly-ionizing water-soluble organic compounds such as alkanols, diols, polyols, ketones, ethers, carboxylic acids are useful in themselves in reducing the strength of ice, frozen from solutions which contain them. A list some of these is shown in Table I of Example 1. In addition, compositions which include chemicals of these classes (if they are liquids) can be conveniently manufactured and provide, in part, a solvent for the ammonium salt.

Other constituents may be included in the composition of the present invention. It is convenient to include some water in the preferred compositions. The water provides a solvent effect for the ammonium salt and in combination with certain organic water-soluble compounds provides compositions of excellent viscosity-temperature characteristics. One drawback of previously known compositions is that they suffer from an undesirable increase in their viscosity at low temperatures, and since the compositions are perforce used in cold weather, the drawback is experienced in the field. This led to the use of heated storage tanks and steam-traced lines which is avoided by the present invention.

It has also been found that various surface active agents are capable of reducing the strength of ice, and it may be desirable to include such surface active agents as part of the composition of this invention. Such use is determined primarily by economic considerations. Non-ionic surfactants of the polyethoxylated type are particularly useful. But anionic surfactants also weaken the strength of ice. Many commercially available surfactants will be known to the skilled worker.

It is obvious to those skilled in the art that other ingredients may be included in minor proportion in the compositions of this invention. Coloring agents or fluorescent marker dyes may be incorporated to provide convenience of analysis of the degree of treatment, stabilizers, anti-oxidants, corrosion inhibiting agents, and other such conventional materials may be included in order to give a composition of satisfactory properties for the market place.

The non- or slightly-ionizing water-soluble organic ingredient may be drawn from a long list: methanol, ethanol, propanol, isopropanol, ethylene glycol, diethylene glycol, hexylene glycol, propylene glycol, formamide, monoethanolamine, diethylene glycol monobutyl ether, formic acid, and acetic acid all show a significant ice weakening ability. Other suitable members of this class of materials will be obvious to the skilled worker, as will be the possibility that mixtures of members of this class be employed in useful compositions. Members which have high flash points and low volatility are preferred.

The proportions of the ingredients used in the compositions of this invention are not extremely critical. The ammonium-containing substance or ammonium salt may be used in from about 1%–20% by weight, preferably from 4–15% and most preferably about 8%, with the upper limit being determined by solubility considerations. The non- or slightly-ionizing organic water soluble ingredient may be employed in the range of from about 5%–90%, preferably from about 30–60% and most preferably about 50% by weight. Water may be employed in the range of from about 2%–90%, preferably from about 40–60%. Conventional additives will generally constitute less than about 5% by weight of the composition.

A conventional additive which is preferred in this composition for the purpose of corrosion inhibition is ammonium pentaborate or ammonium biborate. These additives are less costly than their sodium or potassium analogs, and have the additional advantage of serving as a source of ammonium ion. However, the choice of anticorrosion agent is not restricted to these materials. Other agents which have been found effective include: slats of benzoic acid, salts of nitrous acid, and borax.

The compositions of this invention may be applied to the particulate material, for example, coal by conventional techniques. In view of its unexpected strength reducing properties, only a small amount of the compositions of the present invention need to be applied to both raw and processed coal. The exact quantities used are based upon the amount of surface moisture present and the particle size of the coal. Application rates of ½ to 4 pints per ton have proven to be effective. The application rate may readily be determined by one of ordinary skill in the art.

In applying the composition to coal, in a preferred embodiment of the process, a fine spray of the composition reaching to the outside edges of the coal stream is all that is necessary for an effective treatment. Normally, spraying takes place by mounting a spray bar where the coal leaves the load-out chute as it is being loaded into hoppers or coal cars to ensure that the coal is well sprayed since the effectiveness of the treatment is dependent upon how thoroughly the composition is dispersed onto the coal.

In another aspect of the invention, the composition may be applied to conveyor belts used at below freezing (32° F.) temperatures to mitigate against slippage of particulate materials thereon as described in U.S. Pat. No. 4,163,079. As described therein, and as equally applicable to the present invention, the ability of the composition employed to reduce the strength of ice is believed to play a significant part in its ability to keep the belt surface free from a detrimental accumulation of ice, even at fairly low concentrations and cold temperatures, e.g., below 20° F. ($-7°$ C.) and even below 0° F. ($-18°$ C.). Thus, though some ice may form, it is of reduced compressive strength and is easily broken up by the moving particulate and therefore does not accumulate to any appreciable extent.

The invention may be employed with all forms of divided solids which themselves are neither water-soluble nor water swellable. Representative of such materials are various forms of coal, mineral ores such as bauxite, iron ore, copper ore, taconite, and the like.

Additionally, the composition may contain up to about 2.0% by weight of dimethyl polysiloxane, preferably about 0.1 to about 1.5%. If employed, the polysiloxane is preferably of the type having a kinematic viscosity of at least about 100,000 centistokes. Commercially available aqueous emulsions, such as Dow Corning HV-490 Emulsions, may be used as the source of the polysiloxane.

The treating composition may be applied to the belt surface in any convenient manner, such as with spray, brush, or roller applicators. The treating compositions are applied at a rate of from about 0.001–0.005 gal/ft$^2$, and preferably about 0.002–0.004 gal/ft$^2$ (0.08–0.16 l/m$^2$). Depending on the particular compositions, and the conditions of use, treatment, and exposure, slight variation outside these ranges may be tolerated, but too little treating fluid is generally ineffective in keeping the belt substantially free of detrimental ice build-up for any appreciable time, and too much fluid can actually lubricate the belt to the extent that objectionable slippage of the particulate occurs. Similarly, the particular compositions, and the conditions of use, treatment, and exposure will affect the frequency of treatment. A single treatment may be effective for from about 1 to as many as 8 hours or more. In general, however, from 1 to 4 treatments per 8-hours working shift effectively maintains trouble free operation of the conveyor belt system.

The present invention is based upon the discovery that the replacement of sodium ion by ammonium ion in the prior art compositions results in an unexpected decrease in the strength of the ice as may be seen from the following examples.

In the following examples, the strength of the ice was measured by a standardized test procedure for ice and frozen materials. This test is a "push-down" test as it is believed to be the most reliable and reproducible. In addition, multiple samples were run in order to average out the scatter of values which is characteristic of ice-strength testing.

The central feature of the test apparatus is a Dillon flexure load cell. This device is mounted on a precision metal stand, and is connected to a ram. The entire ram and load cell assembly is driven vertically downwards by an accurate speed-controlled electric motor operating through a gear mechanism.

During operation, a sample is placed on a support in the path of the ram which drives into the center of the sample. A stable DC power supply is provided to the load cell, and the load cell provides a changing millivolt output which is supplied to a chart recorder. The load cell is periodically calibrated with weights, and the breaking strength of each sample measured from the chart recorder paper with a ruler by comparison with the output of the calibrating weights. A linear ram speed of 2.25 mm/second was used.

The invention and its superiority over the prior art will be demonstrated by the following examples. In each case, the entry under the heading *samples* refers to the number of replicate tests performed. The reported strength values are the average for that number of samples. All percentages are in terms of weight percent unless otherwise specified.

EXAMPLE 1

Ice samples for strength testing were prepared by weighing 30.0 g of test solutions into plastic molds. The molds were then placed in a freezer at −20° C. for not less than 15 hours. The resulting ice test pieces, in the form of square plates 0.8 cm×6 cm×6 cm, were then broken in a "push-down" test in the previously described apparatus. Additives were tested at two levels of concentration, 1.2%, (shown in Column A), and 0.2% (shown in Column B).

TABLE I

| ADDITIVE | SAMPLES | STRENGTH (LBS.) A | B |
|---|---|---|---|
| Water | 50 | 53.5 | 53.5 |
| Methanol | 6 | 6.5 | 18.3 |
| Ethanol | 6 | 4.3 | 22.6 |
| Propanol | 6 | 13.2 | 14.9 |
| Isopropanol | 6 | 5.8 | 12.8 |
| Ethylene Glycol | 6 | 8.5 | 18.9 |

TABLE I-continued

| ADDITIVE | SAMPLES | STRENGTH (LBS.) A | B |
|---|---|---|---|
| Diethylene Glycol | 6 | 8.1 | 22.9 |
| Hexylene Glycol | 6 | 7.1 | 25.7 |
| Propylene Glycol | 6 | 6.2 | 16.1 |
| Formamide | 6 | 10.2 | 21.9 |
| Monoethanolamine | 6 | 8.0 | 27.1 |
| Diethylene Glycol Monobutyl Ether | 6 | 9.4 | 23.4 |
| Urea | 6 | 13.0 | 36.3 |
| Aerosol GPG | 6 | 13.1 | 17.4 |
| Neodol 91-8 | 6 | 13.6 | 14.3 |
| Neodol 91-6 | 6 | 12.9 | 16.2 |
| Tergitol 15-S-7 | 6 | 9.7 | 16.5 |
| Petro II | 6 | 21.6 | 20.1 |
| Triton X-100 | 6 | 12.5 | 21.0 |
| Formic Acid | 6 | 8.7 | 26.4 |
| Acetic Acid | 6 | 8.8 | 18.1 |
| 9:1 Ethylene Glycol: Methanol | | 9.6 | 18.1 |
| 9:1 Diethylene Glycol: Methanol | 6 | 11.2 | 19.8 |
| 4:1 Ethylene Glycol: Methanol | 6 | 6.2 | 22.0 |
| 4:1 Diethylene Glycol: Methanol | 6 | 7.5 | 19.1 |
| 4:1 Ethylene Glycol: Propanol | 6 | 8.3 | 18.4 |
| 4:1 Diethylene Glycol: Propanol | 6 | 8.9 | 21.5 |
| 4:1 Ethylene Glycol: Isopropanol | 6 | 7.1 | 17.8 |
| 4:1 Diethylene Glycol: Isopropanol | 6 | 5.6 | 15.2 |
| NF-40-100 | 6 | 6.4 | 18.5 |
| NF-40-200 | 6 | 9.1 | 21.8 |
| NF-40-300 | 6 | 4.4 | 13.9 |
| NF-40-100 | Ammonium formate 8%, ammonium sulfate 5%, ethylene glycol 34%, methanol 5%, ammonium pentaborate 0.7%, 47.3% water | | |
| NF-40-200 | Ammonium acetate 8%, diethylene glycol 34%, methanol 10%, ammonium pentaborate 0.7%, remainder water | | |
| NF-40-300 | Ammonium acetate 8%, diethylene glycol 34%, methanol 10%, ammonium pentaborate 0.7%, *Tergitol 15-S-7 5%, remainder water | | |

*nonionic surfactant, ethoxylated alcohol

EXAMPLE 2

Additives were tested at the 1% level of concentration to demonstrate the effect of replacement of sodium ion by ammonium ion with nitrate as the anion in accordance with the method of Example 1.

| ADDITIVE | SAMPLES | STRENGTH (LBS.) |
|---|---|---|
| NF-40-500 | 24 | 9.2 |
| NF-40-600 | 48 | 16.7 |
| NF-40-500 | Ammonium nitrate 8%, diethylene glycol 46%, ammonium pentaborate 0.7%, 45.3% water | |
| NF-40-600 | Sodium nitrate 8%, diethylene glycol 46%, ammonium pentaborate 0.7%, 45.3% water | |

EXAMPLE 3

Additives were tested at the 1% level of concentration to determine the effect of replacement of sodium ion by ammonium ion with acetate as the anion in accordance with the method of Example 1.

| ADDITIVE | SAMPLES | STRENGTH (LBS.) |
|---|---|---|
| NF-40-700 | 47 | 10.1 |

-continued

| ADDITIVE | SAMPLES | STRENGTH (LBS.) |
|---|---|---|
| NF-40-800 | 48 | 17.6 |
| NF-40-700 | Ammonium acetate 8%, diethylene glycol 46%, ammonium pentaborate 0.7%, 45.3% water | |
| NF-40-800 | Sodium acetate 8%, diethylene 46%, ammonium pentaborate 0.7%, 45.3% water | |

EXAMPLE 4

Additives were tested at the 1% level of concentration to determine the effect of replacement of sodium ion by ammonium ion with sulfate as the anion.

| ADDITIVE | SAMPLES | STRENGTH (LBS.) |
|---|---|---|
| NF-40-900 | 24 | 14.3 |
| NF-40-1000 | 48 | 16.0 |
| NF-40-900 | Ammonium sulfate 8%, diethylene glycol 46%, ammonium pentaborate 0.7%, remainder water. | |
| NF-40-1000* | Sodium sulfate 8%, diethylene glycol 46%, ammonium pentaborate 0.7%, remainder water. | |

*This composition cannot in fact be made due to the limited solubility of the sodium sulfate. For test purposes the solution was made at 3:1 dilution with water and used in a compensating amount.

EXAMPLE 5

The superior performance of a composition containing ammonium ion compared with that containing sodium ion has also been demonstrated using frozen coal samples. A low-volatile, bituminous, West Virginia coal was screened and material in the size range $-\frac{1}{8}''$ to $+10$ mesh was obtained. The moisture of the coal was adjusted to 12%, and 50.0 g samples of the coal were taken. The additives of Example 3 were applied at the rate equivalent to three pounds per ton (75 mg per 50.0 g of coal). The coal samples were frozen in plastic molds for 15 hours at the temperature of $-20°$ C., and their strength was determined by the method described previously.

| ADDITIVES | SAMPLES | STRENGTH (LBS.) |
|---|---|---|
| NF-40-700 on coal | 44 | 8.4 |
| NF-40-800 on coal | 49 | 15.1 |

EXAMPLE 6

With ammonium ion present, there is considerable variation possible in the other ingredients of the composition, while at the same time low ice strength is retained. This is demonstrated by the strength of ice samples measured as previously described.

| ADDITIVE | SAMPLES | STRENGTH (LBS.) |
|---|---|---|
| NF-40-1100 | 48 | 12.7 |
| NF-40-1200 | 24 | 11.1 |
| NF-40-1300 | 24 | 6.5 |
| NF-40-1100 | Ammonium acetate 8%, ethylene glycol 46%, ammonium pentaborate 0.7%, remainder water | |
| NF-40-1200 | Ammonium nitrate 8%, diethylene glycol 41%, methanol 5%, ammonium pentaborate 0.7%, remainder water | |
| NF-40-1300 | Ammonium acetate 8%, diethylene glycol 46%, Neodol 91-8 5%, ammonium pentaborate 0.7%, remainder water; Neodol 91-8 is a non-ionic surfactant which is an ethoxylated linear alcohol | |

The effect of the replacement of the sodium ion by the ammonium ion may be readily seen from these examples. It is therefore apparent that it is desirable to exclude the presence of sodium ion from the composition of the present invention. It may not be feasible to totally exclude all sodium, nor necessary, in view of its presence in the water supply used in preparing and applying the compositions of this invention. However, it is preferred to keep the sodium concentration as low as possible so as not to deleteriously effect the synergistic properties of the ammonium ion in the compositions of the present invention. The ammonium ion is present in the composition of the present invention at a synergistic concentration as compared to the sodium ion concentration of the prior art compositions. The ratio of the water-soluble organic compound which is non-ionizing or only slightly ionizing to the organic or inorganic substance containing ammonium ion is in the range of 1–15.

One factor which influences the proportions of the ingredients is the viscosity-temperature behavior of the composition. This can be determined by a simple test with a cooling bath and a commercial viscosimeter. A composition with a Brookfield viscosity of less than 500 centipoise at $-40°$ C. is preferred. Another factor which influences the proportions of the ingredients is the freezing point of the composition, and the temperature to which it must be cooled to cause "salting-out" of the ammonium salts. Compositions which neither freeze nor salt out at $-40°$ C. are preferred. The exact concentration of ingredients in the composition as well as its rate of application can be readily determined by one of ordinary skill in the art based on the above.

What is claimed is:

1. A composition for weakening ice formed between particulate materials consisting essentially of from 5–90% by weight of a water-soluble organic compound which is non-ionizing or only slightly ionizing selected from the group consisting of alkanols, diols, polyols, ketones, ethers, carboxylic acids and mixtures thereof; and from 1–20% by weight of a highly soluble inorganic or organic substance containing ammonium ion and selected from the group consisting of ammonium acetate, ammonium nitrate, ammonium sulfate, ammonium sulfamate, ammonium formate, ammonium cyanate, ammonium thiocyanate, ammonium carbonate, ammonium pentaborate and mixtures thereof.

2. The composition of claim 1 wherein the ammonium compound is ammonium nitrate, ammonium acetate, ammonium pentaborate or mixtures thereof.

3. The composition of claim 1 wherein the organic compound is ethylene glycol or diethylene glycol.

4. The composition of claim 3 consisting essentially of ammonium acetate, diethylene glycol, ammonium pentaborate and water.

5. The composition of claim 4 wherein the ammonium acetate is present at about 8%, and the diethylene glycol and water are each present at about 45%.

6. A composition of claim 1 wherein the non or slightly ionizing water-soluble organic compound selected from the group consisting of methanol, ethanol, propanol, isopropanol, ethylene glycol, diethylene glycol, hexylene glycol, propylene glycol, formamide, monoethanolamine, diethylene glycol monobutyl ether, formic acid, and acetic acid.

7. The composition of claim 1 wherein the ammonium containing compound is present in an amount of from 4–15%, the non or slightly ionizing organic water-soluble compound is present in an amount of 30–60% by weight and water is present in an amount of from 40–60% by weight.

8. The composition of claim 1 which also contains a non-ionic or anionic surfactant.

9. A method of reducing the mechanical strength of a frozen particulate mass by adding to the surface of the particles, prior to freezing, a composition comprising 5–90% of a water-soluble organic compound which is non-ionizing or only slightly ionizing and 1–20% by weight of a highly soluble inorganic or organic substance containing ammonium ion.

10. The method of claim 9 wherein the ammonium compound is selected from the group consisting of ammonium acetate, ammonium nitrate, ammonium sulfate, ammonium sulfamate, ammonium formate, ammonium cyanate, ammonium thiocyanate, ammonium carbonate, ammonium pentaborate and mixtures thereof and the water-soluble non or slightly ionizing water-soluble organic compound selected from the group consisting of alkanols, diols, polyols, ketones, ethers, carboxylic acids and mixtures thereof.

11. The method of claim 10 wherein the ammonium compound is ammonium nitrate, ammonium acetate, ammonium pentaborate or mixtures thereof and the water-soluble organic compound which is non-ionizing or slightly ionizing is ethylene glycol or diethylene glycol.

12. The method of claim 11 wherein ammonium acetate is present at about 8% and diethylene glycol and water are each present at about 45%.

13. The method of claim 9 wherein the particulate material is coal.

14. A method of reducing slippage of particulate material on a conveyor belt, at below freezing temperatures which comprises applying an effective amount of a composition comprising from 5–90% by weight of a water-soluble organic compound which is not ionizing or only slightly ionizing and from 1–20% by weight of a highly soluble inorganic or organic substance containing ammonium ion, to said belt.

15. The method of claim 14 wherein the ammonium compound selected from the group consisting of ammonium acetate, ammonium nitrate, ammonium sulfate, ammonium sulfamate, ammonium formate, ammonium cyanate, ammonium thiocyanate, ammonium carbonate, ammonium pentaborate and mixtures thereof and the water-soluble non or slightly ionizing water-soluble organic compound is selected from the group consisting of alkanols, diols, polyols, ketones, ethers, carboxylic acids, and mixtures thereof.

16. The method of claim 14 wherein said composition also contains from about 0.1 to about 1.5% by weight dimethyl polysiloxane.

17. The method of claim 14 wherein the particulate material is coal.

* * * * *